(12) United States Patent
Washida et al.

(10) Patent No.: US 7,820,286 B2
(45) Date of Patent: *Oct. 26, 2010

(54) COATING COMPOSITION AND RESIN ARTICLE HAVING OPTICAL PERMEABILITY

(75) Inventors: Masanori Washida, Sabae (JP); Hizashi Sonezaki, Sabae (JP)

(73) Assignee: Asahi Lite Optical Co., Ltd., Fukui (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/084,066

(22) PCT Filed: Oct. 26, 2006

(86) PCT No.: PCT/JP2006/321401

§ 371 (c)(1),
(2), (4) Date: May 14, 2008

(87) PCT Pub. No.: WO2007/049711

PCT Pub. Date: May 3, 2007

(65) Prior Publication Data

US 2008/0292884 A1    Nov. 27, 2008

(30) Foreign Application Priority Data

Oct. 26, 2005    (JP)    ............................. 2005-311135

(51) Int. Cl.
*B32B 27/36* (2006.01)
*C09D 183/04* (2006.01)
*C09D 7/12* (2006.01)
*G02B 1/11* (2006.01)
*G02C 7/02* (2006.01)

(52) U.S. Cl. ............... 428/328; 106/287.1; 106/287.13; 106/287.14; 106/287.16; 428/331; 428/412; 428/447; 428/451

(58) Field of Classification Search ............... 106/287.1, 106/287.13, 287.14, 287.16; 428/328, 331, 428/412, 447, 451

See application file for complete search history.

(56) References Cited

U.S. PATENT DOCUMENTS

| | | | |
|---|---|---|---|
| 5,349,002 A | 9/1994 | Patel | ........................ 428/412 |
| 6,051,310 A * | 4/2000 | Cano et al. | ................... 428/336 |
| 6,057,039 A | 5/2000 | Takeshita et al. | ............. 428/447 |
| 6,742,241 B1 | 6/2004 | Sasaki | ..................... 29/603.07 |
| 7,183,004 B2 | 2/2007 | Sonezaki et al. | ............... 28/412 |

FOREIGN PATENT DOCUMENTS

| | | |
|---|---|---|
| JP | 2-289801 | 11/1990 |
| JP | 4-126784 | 4/1992 |
| JP | 5-098214 | 4/1993 |
| JP | 5-287241 | 11/1993 |
| JP | 6-025600 | 2/1994 |
| JP | 6-207144 | 7/1994 |
| JP | 6-256718 | 9/1994 |
| JP | 8-048940 | 2/1996 |
| JP | 8-238683 | 9/1996 |
| JP | 8-295846 | 11/1996 |
| JP | 8-311240 | 11/1996 |
| JP | 8-311401 | 11/1996 |
| JP | 8-311402 | 11/1996 |
| JP | 9-125003 | 5/1997 |
| JP | 97/41185 | 11/1997 |
| JP | 10-102001 | 4/1998 |
| JP | 10-245522 | 9/1998 |
| JP | 10-245523 | 9/1998 |
| JP | 10-306258 | 11/1998 |
| JP | 11-035886 | 2/1999 |
| JP | 11-116843 | 4/1999 |
| JP | 11-148048 | 6/1999 |
| JP | 2000-009903 | 1/2000 |
| JP | 2000-063754 | 2/2000 |
| JP | 2001-023115 | 1/2001 |
| JP | 2001-122621 | 5/2001 |
| JP | 2002-129102 | 5/2002 |
| JP | 2005-015324 | 1/2005 |
| JP | 2005-015756 | 1/2005 |
| WO | WO- 2005/023946 | 3/2005 |

* cited by examiner

*Primary Examiner*—D. S Nakarani
(74) *Attorney, Agent, or Firm*—Jordan and Hamburg LLP

(57) ABSTRACT

A coating composition capable of forming a curable coating layer having a sufficient dyeability on a resin substrate and improving adhesion after dyeing between the resin substrate and the curable coating layer, and a resin product having optical permeability applied with the curable coating layer by the composition are provided. The coating composition contains an ingredient (A): a hydrolyzate of an organosilane with the content of a bifunctional organosilane of from 50 to 100% by weight, an ingredient (B): colloid particles of metal oxide, and an ingredient (C): a solvent.

7 Claims, No Drawings

COATING COMPOSITION AND RESIN ARTICLE HAVING OPTICAL PERMEABILITY

BACKGROUND OF THE INVENTION

The present invention concerns a coating composition for coating a curable layer to a resin substrate and a resin article having optical permeability applied with a curable coating layer by the coating composition.

Plastic molding products have advantages such as reduced weight, impact resistance, dyeability, and fabricability compared with those of glass and have a primary role particularly in the field of lenses such as spectacle lenses and lenses for use in electronic equipments. On the contrary, they are inferior, for example, in view of scratch resistance and heat resistance, and various attempts have been made for improvement and modification for improving such drawbacks. As a method of improving the scratch resistance, a curable coating layer has generally been applied to plastic substrates. The curable layer generally includes a coating composition comprising a hydrolyzate of an organosilane as a main ingredient. Since interference fringes become conspicuous to cause poor appearance when a difference of refractive index relative to a substrate is large, the refractive index is controlled by dispersing fine particles of metal oxides into the coating composition. In recent years, highly refractive substrates have become used for plastic substrates, particularly, in spectacle lens. Techniques of fine particle sols of metal oxides and coating compositions containing them coping with such increase in the refractive index are disclosed, for example, in JP-A Nos. 2001-122621, 2001-123115, 2005-15324, and 2005-15756.

However, in a case of coating the coating compositions as described above to the resin substrates intending for forming the curable layer, adhesion is poor and they are not suitable to practical use both for initial adhesion and weather proof adhesion. Accordingly, it requires a two step process of coating a pre-treatment liquid to a resin substrate for providing adhesion and then coating a coating composition. Particularly, in polycarbonate resin substrates, adhesion is poor and coating of the pretreatment liquid is indispensable. Further, as other feature of the polycarbonate resin, it is difficult to be dyed compared with other resins and, in a case where it is necessary for dyeing such a resin of poor dyeability, it is necessary to make the coating layer dyeable.

Further, JP-A No. 06-256718 discloses a curable layer composition that adheres with a thermoplastic sheet with no application of a pretreatment liquid by incorporating a caprolactone group polyester polyol as an adhesion promoter to a coating composition. However, also the composition is insufficient for adhesion and, when the caprolactone group polyester polyol is incorporated to such an extent as capable of obtaining necessary adhesion, this results in a problem that a resin composite product applied with the curable layer suffers from remarkable whitening. The whitening phenomenon remarkably worsens the performance for products such as optical products, for example, spectacle lenses and application is not possible to those products for which whitening phenomenon is undesirable. In a case of attempting to decrease the amount of the caprolactone group polyester polyol to such an extent as not causing whitening, adhesion is no more obtainable.

The present inventors have previously proposed a coating composition containing a polycarbonate diol for solving the subject described above (pamphlet of WO2005/23946). According to the coating composition, a curable coating layer can be formed with one solution without coating a pretreatment liquid to a resin substrate. However, since the curable coating layer is formed without forming a primer layer by the coating of the pretreatment liquid, in a case where the substrate is a resin difficult to be dyed as a polycarbonate resin, the dyeability has to be provided only by one layer of the curable coating layer. In a case of adding a sufficient amount of a dyeability providing agent to the coating composition intending for providing a dyeability at a practical level by only one curable coating layer, adhesion of the curable coating layer after dyeing or adhesion after conducting salt water boiling test was worsened extremely.

Patent Document 1: JP-A No. 2001-122621
Patent Document 2: JP-A No. 2001-23115
Patent Document 3: JP-A No. 2005-15324
Patent Document 4: JP-A No. 2005-15756
Patent Document 5: JP-A No. 06-256718
Patent Document 6: pamphlet WO2005/23946

SUMMARY OF THE INVENTION

A subject to be solved by the invention is to form a curable coating layer having sufficient dyeability on a resin substrate and improve adhesion after dyeing between a resin substrate and a curable coating layer.

The present inventors have found that a sufficient dyeability can be provided to a curable coating layer by forming a coating layer forming ingredient by using a hydrolyzate of a bifunctional organosilane. A bifunctional organosilane is used by 50 to 100% by weight for the entire weight of an organosilane to be hydrolyzed and a coating layer forming ingredient is formed by the hydrolyzate thereof. That is, a coating composition according to the present invention contains the following ingredients (A) to (C):

Ingredient (A): hydrolyzate of an organosilane with the content of a bifunctional organosilane of from 50 to 100% by weight, Ingredient (B): colloid particles of metal oxide, and Ingredient (C): solvent.

For improving the initial adhesion and weather proof adhesion, a polycarbonate diol is incorporated as an ingredient (D).

The content for the ingredient (D) is preferably from 0.01% by weight to 7% by weight.

The ingredient (B) may be those containing colloid particles with one or more oxides of metals selected from the group consisting of tin, titanium, zirconium, antimony, and silicon.

A resin article having optical permeability according to the invention is those applied with a curable coating layer by the coating composition of the invention described above to a resin substrate.

For the resin substrate of a resin article having optical permeability, a polycarbonate resin is used preferably.

A mono-layer or multi-layer anti-reflection film comprising an inorganic material can be disposed on the curable coating layer.

Further, a lens substrate for use in spectacle is used for the resin substrate.

According to the coating composition of the invention, a curable coating layer of good dyeability can be formed. Further, even for a substrate difficult to be dyed such as a polycarbonate resin, a curable coating layer suppressing the whitening phenomenon in view of the appearance can be formed with one solution without coating a pretreatment solution to form a curable coating layer which is satisfactory also in view of adhesion after dyeing, salt water boiling resistance and weather proofness.

DETAILED DESCRIPTION OF THE INVENTION

The hydrolyzate of the organosilane used in the invention is an organic silicon compound as described below.

Monofunctional silanes represented by $R_3SiX$ (where R is an organic group having an alkyl group, phenyl group, vinyl group, methacryloxy group, mercapto group, amino group, or epoxy group, and X is a hydrolysable group) including, as specific examples, trimethyl methoxy silane, triethyl methoxy silane, trimethyl ethoxy silane, triethyl ethoxy silane, triphenyl methoxy silane, diphenyl methyl methoxy silane, phenyl dimethyl methoxy silane, phenyl dimethyl ethoxy silane, vinyl dimethyl methoxy silane, vinyl dimethylethoxy silane, γ-acryloxypropyl dimethyl methoxy silane, γ-methacryloxy propyl dimethyl methoxy silane, γ-mercaptopropyl dimethyl methoxy silane, γ-mercaptopropyl dimethyl ethoxy silane, N-β(aminoethyl)γ-aminopropyl dimethyl methoxy silane, γ-aminopropyl dimethyl methoxy silane, γ-aminopropyl dimethyl ethoxy silane, γ-glycidoxypropyl dimethyl methoxy silane, γ-glycidoxypropyl dimethyl ethoxy silane, and β-(3,4-epoxy cyclohexyl)ethyl dimethyl methoxy silane.

Bifunctional silanes represented by $R_2SiX_2$ include, as specific examples, dimethyl dimethoxy silane, diethyl dimethoxy silane, dimethyl diethoxy silane, diethyl diethoxy silane, diphenyl dimethoxy silane, phenyl methyl dimethoxy silane, phenylmethyl diethoxy silane, vinylmethyl dimethoxy silane, vinylmethyl diethoxy silane, γ-acryloxypropyl methyl dimethoxy silane, γ-methacryloxypropyl dimethyl dimethoxy silane, γ-mercaptopropyl methyl dimethoxy silane, γ-mercapto propyl methyl diethoxy silane, N-β(aminoethyl)γ-aminopropyl methyl dimethoxy silane, γ-aminopropyl methyl dimethoxy silane, γ-aminopropyl methyl diethoxy silane, γ-glycidoxy propylmethyl dimethoxy silane, γ-glycidoxypropyl methyl diethoxy silane, and β-(3,4-epoxy cyclohexyl)ethyl methyl dimethoxy silane.

Trifunctional silanes represented by $RSiX_3$ including, as specific examples, methyl trimethoxy silane, ethyl trimethoxy silane, methyl triethoxysilane, ethyl triethoxysilane, phenyl trimethoxy silane, phenyl triethoxysilane, vinyl trimethoxy silane, vinyl triethoxysilane, vinyl(β-methoxyethoxy)silane, γ-acryloxypropyl trimethoxy silane, γ-methacryloxypropyl trimethoxy silane, γ-mercaptopropyl trimethoxy silane, γ-aminopropyl trimethoxy silane, γ-amino propyl triethoxysilane, γ-glycidoxy propyl trimethoxy silane, β-glycidoxy propyl trimethoxy silane, γ-glycidoxy propyl triethoxysilane, β-glycidoxy propyl triethoxysilane, and β-(3,4-epoxycyclohexyl)ethyl trimethoxy silane.

Tetrafunctional silanes represented by $SiX_4$ including, as specific examples, tetraethyl orthosilicate, tetramethyl orthosilicate, etc.

Among them, hydrolyzates of one or more organosilanes are incorporated in the coating composition of the invention and a bifunctional organosilane is used by 50 to 100% by weight for the entire weight of the organosilane to be hydrolyzed. Incorporation of a hydrolyzate of one type of bifunctional organosilane naturally is included in the range. In a case where the weight ratio of the bifunctional organosilane is less than 50% by weight, the dyeability of the curable coating layer becomes not sufficient.

In the organosilanes, those of bifuntionality are mainly used because they are suitable to the formation of the dyeable curable coating layer. It is considered that since the condensation reaction rate of the bifunctional organosilane is slower compared with that of trifunctional or tetrafunctional silane, crosslinking density is lowered, and the dyeability is provided together with flexibility in the curable coating layer after curing. In the monofunctional material, since the reaction rate is excessively slow, the substrate is deformed or the energy cost is increased due to excess application of heat during formation of coating layer. Further, the hardness of the coating layer itself is also lowered.

The content of the hydrolyzate of the organosilane is preferably from 10.0% by weight to 40.0% by weight.

For colloid particles of metal oxides, various metal oxides are selected in view of refractive index, stability, dispersibility, scratch resistance, etc., and a sol formed by dispersing the colloid particles in a solvent can be used. Preferably, those containing colloid particles of oxides of one or more metals of tin, titanium, zirconium, antimony, silicon, and tungsten are used. For example, sols comprising colloid particles formed by using titanium oxide as a core and coating the same with antimony pentoxide as a main ingredient as described in JP-A Nos. 2001-122621 and 2001-123115, or sols comprising colloid particles using tin oxide and zirconium oxide as a core and coating the same with antimony pentaoxide and silica as a main ingredient described in JP-A Nos. 2005-15324 and 2005-15756 are also used preferably.

The content of the colloid particles of the metal oxide is preferably from 20.0% by weight to 60.0% by weight as the weight containing methanol as a dispersant, and from 5.0% by weight to 18.0% by weight on the basis of the solid content.

The solvent includes aqueous and organic solvents. The aqueous solvent includes water or an organic solvent containing water such as methanol. The organic solvent includes aromatic hydrocarbons, chloroaromatic hydrocarbons, chloroaliphatic hydrocarbons, alcohols, ester, ethers, ketones, glycol ethers, alicyclic hydrocarbons, aliphatic hydrocarbons or mixtures of aliphatic or aromatic hydrocarbons. In view of easy handlability and not causing whitening phenomenon by attacking the surface of the resin substrate, methanol, methoxypropanole, diacetone alcohol, etc, as alcohols can be used preferably.

The polycarbonate diol used in the invention is a polycarbonate ester having a linear aliphatic carbonate skeleton and having hydroxyl groups on both ends, and is generally represented by the following structural formula.

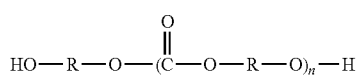

[formula 1]

n is a number of 1 or greater and, preferably, from 1 to 30 and, more preferably, from 1 to 20.

The polycarbonate diol functions as an adhesion promoter and a curable coating layer can be formed by using the same to a resin substrate of poor adhesion such as a polycarbonate resin or other thermoplastic resin without coating the pretreatment solution. In such a case, since the pretreatment layer by the coating of the pretreatment solution is not formed, when the substrate is a polycarbonate resin or the like of poor dyeability, the dyeability only of the one curable coating layer has an influence on the dyeability of resin article per se. Since the curable coating layer formed of the coating composition using the bifunctional organosilane as a main component has a sufficient dyeability, a curable coating layer of favorable adhesion and dyeability can be formed with one solution by the incorporation of the polycarbonate diol without coating the pretreatment solution. Further, since there is no requirement for adding the dyeability providing agent, the curable coating layer is excellent also in the adhesion after dyeing.

The content of the polycarbonate diol is preferably from 0.001% by weight to 12% by weight. In a case where the content is less than 0.001% by weight, a curable coating layer having sufficient adhesion cannot be formed. In a case where it exceeds 12% by weight, the whitening phenomenon becomes conspicuous extremely to worsen the appearance. In a case of application to a spectacle lens, the content is more preferably within a range from 0.01% by weight to 7% by weight.

In the coating composition of the invention, a surfactant can also be incorporated for enhancing the dispersibility of the coating composition and improving the smoothness upon coating to the resin substrate to improve the wettability. Further, it is also possible to incorporate a curing catalyst for promoting the curing reaction or incorporate a UV-absorbent or an anti-oxidant for improving the weather proofness or heat resistance. In addition, it is also possible to incorporate a dyeability providing agent to such an extent as not giving an influence on the adhesion of the curable coating layer after dyeing for further improving the dyeing performance.

The resin article having the optical permeability of the invention is to be described. While there is no particular restriction on the resin substrate used for the resin article, a resin substrate to which the effect of the invention develops particularly remarkably is a polycarbonate resin. The polycarbonate resin is a resin that cannot obtain a sufficient adhesion with the curable coating layer without the pretreatment solution and is difficult to be dyed. Provision of the curable coating layer of excellent dyeability and good adhesion is extremely effective. While the pretreatment layer formed by the coating of the pretreatment solution functions effectively for the impact resistance of resin products (demanded for spectacle lens), the polycarbonate resin is excellent by nature in the impact resistance and it is effective extremely since the step of coating the pretreatment solution can be saved. However, the effect of the invention is obtainable also in other thermoplastic resins such as polyamide resin, polyimide resin, or polyolefin resin, or in thermosetting resins such as polyurethane resin, or copolymer of epoxy resin and episulfide resin. Embodiments (application use) of the resin products include various resin products such as spectacle lenses, camera lenses, electronic equipment lenses, resin sheet, head lamp cover for use in cars, etc.

On the curable coating layer of the resin product, a single-layer or multi-layer anti-reflective film comprising inorganic materials can be provided on the curable coating layer of the resin product. This can improve the transmittance by the decrease of reflection and improve weather proofness. The inorganic anti-reflective film is formed as a thin film by vacuum vapor deposition method or the like using, for example, SiO, $SiO_2$, $SiN_4$, $TiO_2$, $Ti_4O_7$, $Ti_3O_5$, $Ti_2O_3$, TiO, $ZrO_2$, $Al_2O_3$, $MgF_2$, and $Ta_2O_5$. The anti-reflective is preferably used, particularly, for lens products such as spectacle lenses.

EXAMPLE

The present invention is to be described more specifically by way of examples but the invention is not restricted to the examples.

As described in Examples 1 to 4 and Comparative Examples 1 to 3, curable layers were applied by coating various coating compositions to plastic lenses for spectacles made of a polycarbonate resin. Then, interference fringes, initial adhesion, hardness, adhesion resistance to boiling salt water, dyeability, and adhesion after dyeing were evaluated.

Example 1

A composite metal oxide sol comprising tin oxide, zirconium oxide, antimony pentaoxide, or silicon dioxide (solid content 30%, methanol dispersion sol, SUNCOLLOID HX-305M5 manufactured by Nissan Chemical Industries, Ltd.) was weighed by 185.00 g in a flask, and 144.00 g of a hydrolyzate of γ-glycidoxy propylmethyl dimethoxy silane (formed by mixing 115.20 g of γ-glycidoxy propyl methyl dimethoxy silane and 28.80 g of distilled water) was added under stirring. Then, while stirring the liquid mixture, 25.55 g of methanol and 127.45 g of diacetone alcohol were added. Further, 14.50 g of aluminum acetyl acetone was added as a curing catalyst and stirred for 1 hr. Then, 0.50 g of polycarbonate diol (Asahi Kasei PCDL T5651, manufactured by Asahi Kasei Chemicals, Co.), 0.2 g of a silicone surfactant (Paintad 32) as a flow control agent, and 0.1 g of a silicone surfactant (DOW CORNING 57 ADDITIVE) were added and stirred for 1 hr. The liquid mixture was aged at a room temperature for 48 hr. A plastic lens for use in spectacles made of a polycarbonate resin was manufactured, the liquid mixture described above was coated by a dipping method, and heat cured at 100 to 150° C. for 1 hr and 30 min.

Example 2

A composite metal oxide sol comprising tin oxide, zirconium oxide, antimony pentaoxide, or silicon dioxide (solid content 30%, methanol dispersion sol, SUNCOLLOID HX-305M5 manufactured by Nissan Chemical Industries, Ltd.) was weighed by 185.00 g in a flask, and 175.00 g of hydrolyzate of γ-glycidoxy propylmethyl dimethoxy silane (formed by mixing 140.00 g of γ-glycidoxy propyl methyl dimethoxy silane and 35.00 g of distilled water) was added under stirring. Then, while stirring the liquid mixture, 20.35 g of methanol and 101.65 g of diacetone alcohol were added. Further, 14.50 g of aluminum acetyl acetone was added as a curing catalyst and stirred for 1 hr. Then, 0.50 g of polycarbonate diol (Asahi Kasei PCDL T5651, manufactured by Asahi Kasei Chemicals, Co.), 0.2 g of a silicone surfactant (Paintad 32) as a flow control agent and 0.1 g of a silicone surfactant (DOW CORNING 57 ADDITIVE) were added and stirred for 1 hr. The liquid mixture was aged at a room temperature for 48 hr. A plastic lens for use in spectacles made of a polycarbonate resin was manufactured, the liquid mixture described above was coated by a dipping method, and heat cured at 100 to 150° C. for 1 hr and 30 min.

Example 3

A composite metal oxide sol comprising tin oxide, zirconium oxide, antimony pentaoxide, or silicon dioxide (solid content 30%, methanol dispersion sol, SUNCOLLOID HX-305M5 manufactured by Nissan Chemical Industries, Ltd.) was weighed by 185.00 g in a flask, 25.00 g of hydrolyzate of γ-glycidoxy propyl trimethoxy silane (formed by mixing 18.95 g of γ-glycidoxy propyl trimethoxy silane and 6.05 g of distilled water), and 150.00 g of a hydrolyzate of γ-glycidoxy propyl methyl dimethoxy silane (formed by mixing 120.00 g of γ-glycidoxy propyl methyl dimethoxy silane and 30.0 g of distilled water) was added under stirring. Then, while stirring the liquid mixture, 20.35 g of methanol and 101.65 g of diacetone alcohol were added. Further, 14.50 g of aluminum acetyl acetone was added as a curing catalyst and stirred for 1 hr. Then, 0.50 g of polycarbonate diol (Asahi Kasei PCDL T5651, manufactured by Asahi Kasei Chemicals, Co.), 0.2 g of a silicone surfactant (Paintad 32) as a flow control agent and 0.1 g of a silicone surfactant (DOW CORNING 57 ADDITIVE) were added and stirred for 1 hr. The liquid mixture was aged at a room temperature for 48 hr. A plastic lens for use in spectacles made of a polycarbonate resin was manufactured, the liquid mixture described above was coated by a dipping method, and heat cured at 100 to 150° C. for 1 hr and 30 min.

Example 4

A composite metal oxide sol comprising tin oxide, zirconium oxide, antimony pentaoxide, or silicon dioxide (solid content 30%, methanol dispersion sol, SUNCOLLOID HX-305M5® manufactured by Nissan Chemical Industries, Ltd.) was weighed by 185.00 g in a flask, and 19.90 g of hydrolyzate of methyl trimethoxy silane (formed by mixing 14.76 g of methyl trimethoxy silane and 5.14 g of distilled water), 55.35 g of a hydrolyzate of γ-glycidoxy propyl trimethoxy silane (formed by mixing 41.96 g of γ-glycidoxy propyl trimethoxy silane and 13.39 g of distilled water), and 68.75 g of a hydrolyzate of γ-glycidoxy propyl methyl dimethoxy silane (formed by mixing 55.00 g of γ-glycidoxy propyl methyl dimethoxy silane and 13.75 g of distilled water) were added under stirring. Then, while stirring the liquid mixture, 25.55 g of methanol and 127.45 g of diacetone alcohol were added. Further, 14.50 g of aluminum acetyl acetone was added as a curing catalyst and stirred for 1 hr. Then, 0.50 g of polycarbonate diol (Asahi Kasei PCDL T5651, manufactured by Asahi Kasei Chemicals, Co.), 0.2 g of a silicone surfactant (Paintad 32) as a flow control agent and 0.1 g of a silicone surfactant (DOW CORNING 57 ADDITIVE) were added and stirred for 1 hr. The liquid mixture was aged at a room temperature for 48 hr. A plastic lens for use in spectacles made of a polycarbonate resin was manufactured, the liquid mixture described above was coated by a dipping method, and heat cured at 100 to 150° C. for 1 hr and 30 min.

Comparative Example 1

A composite metal oxide sol comprising tin oxide, zirconium oxide, antimony pentoxide and silicon dioxide (solid content 30%, methanol dispersion sol, SUNCOLLOID HX-305M5 manufactured by Nissan Chemical Industries, Ltd.) was weighed by 185.00 g in a flask, and 38.10 g of a hydrolyzate of methyl trimethoxy silane (formed by mixing 34.29 g of methyl trimethoxy silane and 3.81 g of distilled water) and 105.90 g of hydrolyzate of γ-glycidoxy propyl trimethoxy silane (formed by mixing 78.46 g of γ-glycidoxy propyl trimethoxy silane and 27.44 g of distilled water) were added while stirring. Then, while stirring the liquid mixture, 25.55 g of methanol and 127.45 g of diacetone alcohol were added. Further, 14.50 g of aluminum acetyl acetone was added as a curing catalyst and stirred for 1 hr. Then, 0.50 g of polycarbonate diol (Asahi Kasei PCDL T5651, manufactured by Asahi Kasei Chemicals, Co.), 0.2 g of a silicone surfactant (Paintad 32) as a flow control agent and 0.1 g of a silicone surfactant (DOW CORNING 57 ADDITIVE) were added and stirred for 1 hr. The liquid mixture was aged at a room temperature for 48 hr. A plastic lens for use in spectacles made of a polycarbonate resin was manufactured, the liquid mixture described above was coated by a dipping method, and heat cured at 100 to 150° C. for 1 hr and 30 min.

Comparative Example 2

A composite metal oxide sol comprising tin oxide, zirconium oxide, antimony pentaoxide, and silicon dioxide (solid content 30%, methanol dispersion sol, SUNCOLLOID HX-305M5 manufactured by Nissan Chemical Industries, Ltd.) was weighed by 185.00 g in a flask, and 38.10 g of a hydrolyzate of methyl trimethoxy silane (formed by mixing 34.29 g of methyl trimethoxy silane and 3.81 g of distilled water) and 105.90 g of hydrolyzate of γ-glycidoxy propyl trimethoxy silane (formed by mixing 78.46 g of γ-glycidoxy propyl trimethoxy silane and 27.44 g of distilled water) were added while stirring. Then, while stirring the liquid mixture, 20.55 g of methanol and 117.45 g of diacetone alcohol were added, and then 15.00 g of polypropylene glycol monomethacrylate (Blemmer PP-1000 manufactured by NOF Corporation) was added. Further, 14.50 g of aluminum acetyl acetone was added, as a curing catalyst and stirred for 1 hr. Then, 0.50 g of polycarbonate diol (Asahi Kasei PCDL T5651, manufactured by Asahi Kasei Chemicals, Co.), 0.2 g of a silicone surfactant (Paintad 32) as a flow control agent and 0.1 g of a silicone surfactant (DOW CORNING 57 ADDITIVE) were added and stirred for 1 hr. The liquid mixture was aged at a room temperature for 48 hr. A plastic lens for use in spectacles made of a polycarbonate resin was manufactured, the liquid mixture described above was coated by a dipping method, and heat cured at 100 to 150° C. for 1 hr and 30 min.

Comparative Example 3

A composite metal oxide sol comprising tin oxide, zirconium oxide, antimony pentaoxide, and silicon dioxide (solid content 30%, methanol dispersion sol, SUNCOLLOID HX-305M5 manufactured by Nissan Chemical Industries, Ltd.) was weighed by 185.00 g in a flask, and 38.10 g of a hydrolyzate of methyl trimethoxy silane (formed by mixing 34.29 g of methyl trimethoxy silane and 3.81 g of distilled water) and 105.90 g of a hydrolyzate of γ-glycidoxy propyl trimethoxy silane (formed by mixing 78.46 g of γ-glycidoxy propyl trimethoxy silane and 27.44 g of distilled water) were added while stirring. Then, while stirring the liquid mixture, 20.55 g of methanol and 117.45 g of diacetone alcohol were added and then 15.00 g of polyethylene glycol monomethacrylate (Blemmer PE-90 manufactured by NOF Corporation) was added. Further, 14.50 g of aluminum acetyl acetone was added as a curing catalyst and stirred for 1 hr. Then, 0.50 g of polycarbonate diol (Asahi Kasei PCDL T5651, manufactured by Asahi Kasei Chemicals, Co.), 0.2 g of a silicone surfactant (Paintad 32) as a flow control agent and 0.1 g of a silicone surfactant (DOW CORNING 57 ADDITIVE) were added and stirred for 1 hr. The liquid mixture was aged at a room temperature for 48 hr. A plastic lens for use in spectacles made of a polycarbonate resin was manufactured, the liquid mixture described above was coated by a dipping method, and heat cured at 100 to 150° C. for 1 hr and 30 min.

Evaluation for the coating layers with coating compositions of Examples 1 to 4 and Comparative Examples 1 to 3 is shown in the following table.

TABLE 1

| | Interference fringe | Initial adhesion | SW hardness | Adhesion resistant to boiling saltwater | Dyeing temperature | Dye-ability | Adhesion after dyeing |
|---|---|---|---|---|---|---|---|
| Example 1 | ○ | 100/100 | B | 100/100 | 45 | ○ | 100/100 |
| Example 2 | ○ | 100/100 | B | 100/100 | 47 | ○ | 100/100 |
| Example 3 | ○ | 100/100 | C | 100/100 | 41 | ○ | 100/100 |
| Example 4 | ○ | 100/100 | B | 100/100 | 20 | Δ | 100/100 |
| Com. Example 1 | ○ | 100/100 | B | 100/100 | 11 | X | 100/100 |
| Com. Example 2 | ○ | 100/100 | B | 0/100 | 49 | ○ | 0/100 |
| Com. Example 3 | ○ | 100/100 | B | 0/100 | 79 | ○ | 0/100 |

The evaluation methods in the table are shown below.

(1) Interference Fringe

It was confirmed by visual inspection using a light source for inspection (National Palook 3-wavelength day white light 15 W). The evaluation criterion is as described below.
◉ . . . Interference fringes are extremely few
○ . . . Interference fringes are of such an extent with no problem as spectacle lens
Δ . . . Interference fringes are conspicuous
X . . . Interference fringes are extremely conspicuous (2) Initial Adhesion The initial adhesion was evaluated by a cross hatch test. Numericals in the table show the number of portions for which peeling could not be confirmed in grids by the number of 100.

(3) SW Hardness

The surface of the curable layer was rubbed with steel wool #0000 to evaluate the state of injury. It was rubbed under 1 kg of load for 10 reciprocal cycles. The evaluation standards are described below.
A . . . Injuries were not confirmed at all.
B . . . Some injuries were confirmed.
C . . . Conspicuous injuries can be confirmed.
D . . . Remarkable injuries can be confirmed.
D . . . Many remarkable injuries can be confirmed.
E . . . Injuries can be confirmed in a stripe form.

(4) Adhesion Resistant to Boiling Salt Water

After immersing for 15 min in an NaCl (5 wt %) solution, they were cooled by dipping in city water at about 23° C. for 1 min and peeled for five times by cross hatch test to evaluate the adhesion. Numericals in the table show the number of portions for which peeling in the grids by the number of 100 cannot be confirmed.

(5) Dyeability

Lenses were dipped at 90° C. for 5 min in BPI BLACK of Brain Power Inc. (U.S.A) diluted with distilled water, the entire light transmittance was measured and the dyeing density was evaluated by the following standard.

○ . . . Dyeing density: 40% or higher
Δ . . . Dyeing density: 20% to less than 40%
X . . . Dyeing density: less than 20%

(6) Adhesion after Dyeing

Adhesion after dyeing was evaluated by a cross hatch test. Numericals in the table show the number of portions for which peeling in the grids by the number of 100 could not be confirmed.

The coating composition of the present invention is applicable to various types of resin products such as spectacle lenses, camera lenses, lenses for electronic equipments, resin sheets, and head lamp covers for use in automobiles.

The invention claimed is:

1. A coating composition comprising the following ingredients (A) to D:
   Ingredient (A): a hydrolyzate of an organosilane wherein the organosilane comprises from 50 to 100% by weight of a bifunctional organosilane,
   Ingredient (B): colloid particles of a metal oxide,
   Ingredient (C): a solvent, and
   Ingredient (D): a polycarbonate diol.

2. A coating composition according to claim 1, wherein the content of the ingredient (D) is from 0.01% by weight to 7% by weight.

3. A coating composition according to claims 1 or 2, wherein the ingredient (B) contains colloid particles of one or more oxides of metals selected from the group consisting of tin, titanium, zirconium, antimony, and silicon.

4. A resin product having optical permeability comprising a resin substrate and, on the substrate, a curable coating layer comprising a coating composition according to claims 1 or 2.

5. A resin product having a optical permeability according to claim 4, wherein the resin substrate comprises a polycarbonate resin.

6. A resin product having a light optical permeability according to claim 4, further comprising a single or multi-layer anti-reflection film comprising an inorganic material is disposed on the curable coating layer.

7. A resin product having optical permeability according to claim 4, wherein the resin substrate comprises a spectacle lens substrate.

* * * * *